(12) United States Patent
West et al.

(10) Patent No.: US 6,208,260 B1
(45) Date of Patent: Mar. 27, 2001

(54) PERSONAL WARNING METHOD AND APPARATUS FOR TRAVELING LOADS

(75) Inventors: Jill West, 106 Jyro La., Carencro, LA (US) 70520; David Sperry, 8801 E. Bay Cir., Fort Myres, FL (US) 33908; Samir Berjaoui, Lafayette, LA (US)

(73) Assignees: Jill West, Carencro, LA (US); David Sperry, Fort Myres, FL (US)

( * ) Notice: Subject to any disclaimer, the term of this patent is extended or adjusted under 35 U.S.C. 154(b) by 0 days.

(21) Appl. No.: 09/431,816

(22) Filed: Nov. 2, 1999

(51) Int. Cl.[7] .................................................. G08B 7/00
(52) U.S. Cl. ...................... 340/691.3; 340/567; 340/679; 340/573; 340/539; 340/540; 340/825.31
(58) Field of Search ................................ 340/573, 573.1, 340/573.4, 573.6, 540, 539, 691.3, 567, 679, 825.31

(56) References Cited

U.S. PATENT DOCUMENTS

| | | | |
|---|---|---|---|
| 5,005,001 | * | 4/1991 | Cordery ................................ 340/551 |
| 5,315,289 | * | 5/1994 | Fuller et al. .......................... 340/532 |
| 5,353,011 | * | 10/1994 | Wheeler et al. ...................... 340/572 |
| 5,440,291 | * | 8/1995 | Foster, Jr. et al. ................... 340/562 |
| 5,677,676 | * | 10/1997 | Bell, Jr. ................................ 340/573 |
| 5,727,758 | * | 3/1998 | Penza et al. .......................... 246/124 |
| 5,949,333 | * | 9/1999 | Lehmann et al. ................... 340/571 |

* cited by examiner

Primary Examiner—Jeffery Hofsass
Assistant Examiner—Hung Nguyen
(74) Attorney, Agent, or Firm—Robert N. Montgomery

(57) ABSTRACT

A hazard warning system for warning personnel of potential peril within a specific warning zone, the system including a variable, ultrasonic, and/or infra-red directional transmitter directed to focus on and around a specific hazard and a receiver having both audio and visual warning indicators worn by the worker. Workers outside the warning zone or field not receiving the warning are therefore not immunized by visual and audible signals which are not pertinent to their safety. The warning system further utilizes distance measuring circuitry to automatically determine the distance from the transmitter located on an evaluated crane boom to ground or deck. The distance measurement is then micro processed to maintain a prescribed infra-red field around a suspended object regardless of the boom height. A further embodiment utilizes the technology for a portable signal generator apparatus for attachment to a moving load or vehicle, the warning zone or field may be directed and varied in size and range.

16 Claims, 6 Drawing Sheets

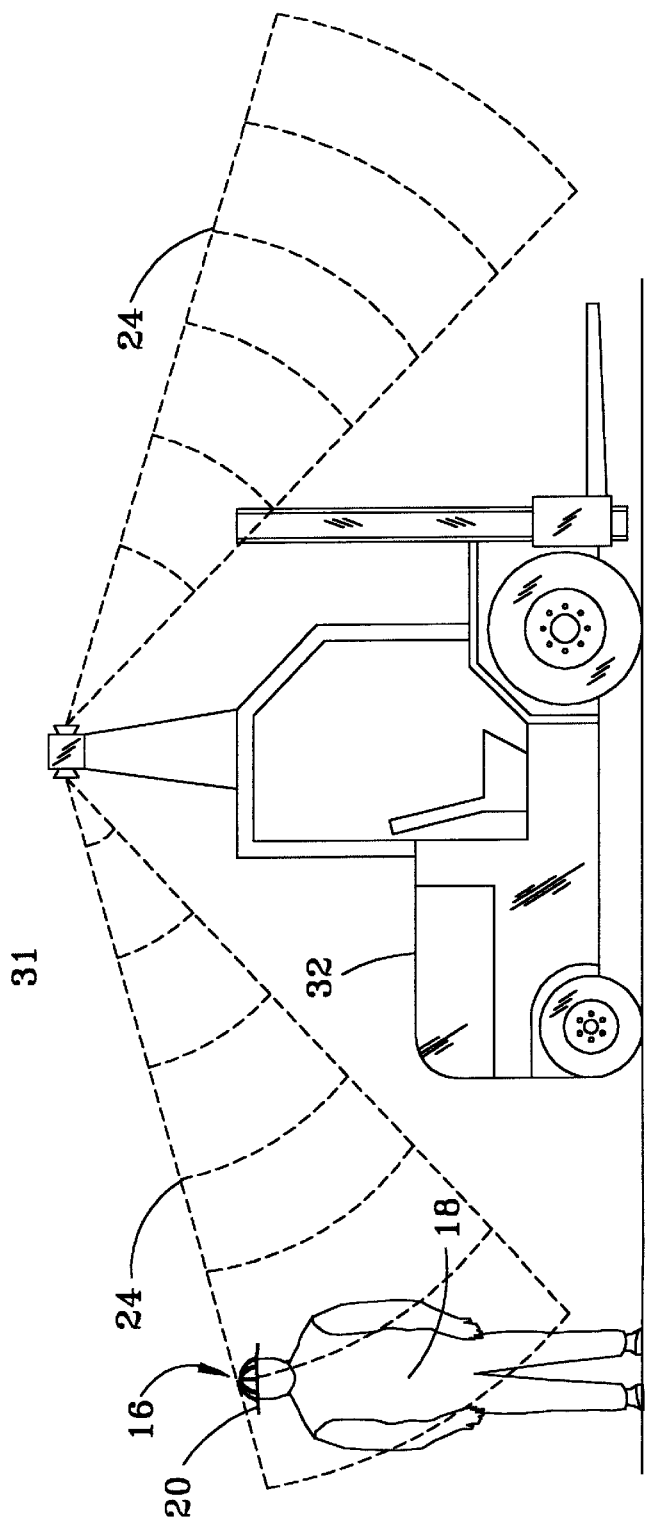
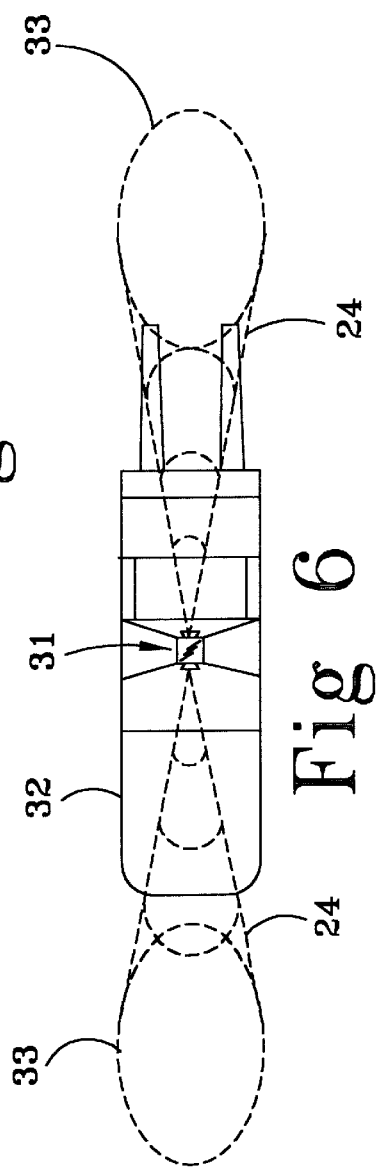
Fig 5
Fig 6

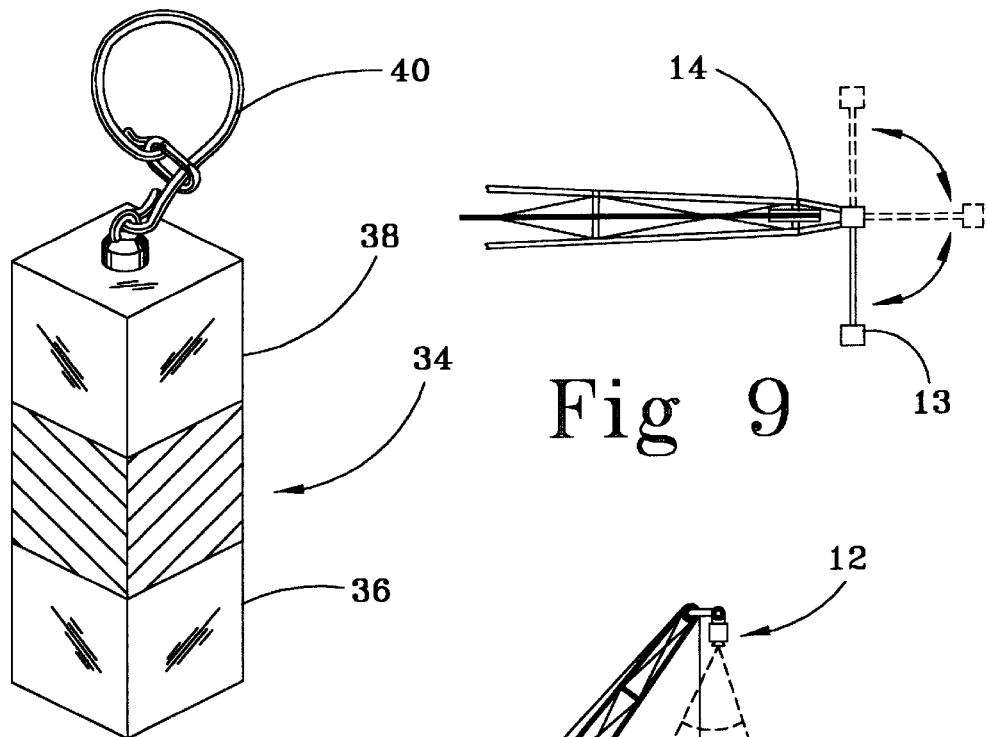
Fig 7
Fig 9
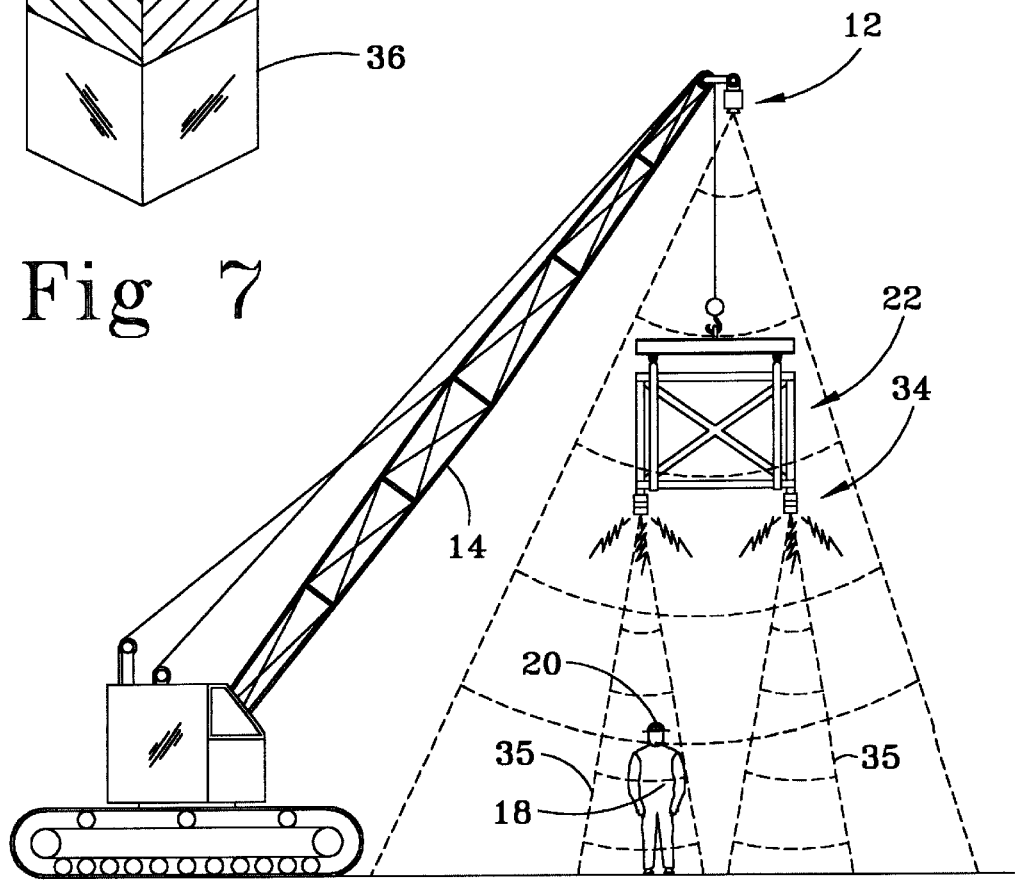
Fig 8

PERSONAL WARNING METHOD AND APPARATUS FOR TRAVELING LOADS

BACKGROUND OF THE INVENTION

1. Field of the Invention

This invention relates generally to personnel warning apparatus used for alerting workers in the path of traveling loads suspended from cranes or on moving vehicles, such as forklifts, and more particularly to a method and apparatus for selectively and personally warning only those workers in the immediate vicinity of a traveling load, especially loads passing over the worker's head.

2. General Background

Safety is a prime concern in the construction, manufacturing, and warehousing industries, especially for individuals working in the immediate vicinity of cranes or vehicles which are constantly moving various loads, often over the heads of the workers. Cranes and traveling vehicles, such as forklifts, generally sound an audible warning indicating that the crane or vehicle is traveling loaded or unloaded regardless of direction. Therefore, workers in the vicinity know the crane is moving but tend to disregard the warning since it is not specifically applicable to them most of the time. The workers simply become desensitized to the audible warnings and/or flashing lights as a result of their constant use, especially when few, if any, workers are in danger at any given time.

Ideally, only those workers who are in danger as a result of a traveling load passing in the near vicinity or overhead should be warned, giving them sufficient time to either move out of the path or at least be aware of the load's presence.

The same situation exists for back-up warning devices used on vehicles and the like. When a warning can be heard for long periods of time or seen and heard from long distances when no immediate danger exists, a certain degree of desensitivity develops. It is therefore becoming more imperative that only those workers who are being placed in immediate physical danger be warned. Some attempts has been made to automatically sence the presence of a worker who may be in harms way, as disclosed by U.S. Pat. No. 4,937,795. This system warns the vehicle operator of the presence of the worker, thereby placing full responsibility on the vehicle operator for avoiding the worker.

It is an object of the present invention to provide a system that alerts the worker only if the worker is in immediate danger and with sufficient time for the worker to take evasive action, thereby placing some responsibility on the worker for his own safety.

SUMMARY OF THE INVENTION

The present invention is based on the need to alert only those workers who are in immediate danger, thus increasing alertness and reducing the chance of desensitization of the workers to unnecessary alarms. In cases where loads are being moved in the vicinity of the workers by a crane, a directional signal transmitter, such as ultrasonic and/or infra-red is attached in a pendulum manner at the tip of the crane boom, thereby allowing the transmitter to align itself with the crane cable and its load regardless of the elevation of the crane boom. The transmitter further incorporates ultrasonic sensor and receiver for sensing and computing the distance from the crane boom tip to the ground or deck surface. Sensor computations are then fed into microprocessor which automatically adjusts an infra-red beam emanating from the transmitter in a conical beam configuration that encompasses the typical load generally transported, thereby forming a diametrical alert zone or field in the form of a field around the load. Therefore, the alert zone or field is always larger than the size of the load. Workers in the area below the overhead crane are provided with signal receivers for attachment to their hard hats which react to the signal being transmitted in the alert zone or field around the load being transported. The personal receiver is a miniature battery operated device combined with a visual and audible signal device, such as a flashing LED, and an audio device, such as a chirper or beeper. In any case, the visual indicator is attached to the worker's hat within the worker's peripheral vision, so as not to be distracting.

It is acknowledged that the load may potentially block a portion of the signal being directed toward and around the load. However, if the signal is detectable in a zone or field several feet in advance of the load, sufficient notice will have been received to gain the attention of the worker prior to the load being directly overhead. The zone or field directly under the load may also be covered by one or more portable signal generators attached to the load, generally at opposite corners or at the load's extreme ends. The load transmitters also produce a conical alert zone or field below the load, thus reinforcing the boom alert zone or field and covering some of the blind spots under the load. The portable signal generators have the same frequency as the crane boom transmitter but have a much smaller range. Therefore, only those workers within the zone or field around the load are alerted to the presence of a moving load.

It is also recognized that this technology can also be adapted to moving vehicles or vehicles carrying loads. In such cases, preferably an infra-red directional transmitter is located above the vehicle and directed towards the rear and downwards, thus producing an elliptical conical pattern for a limited distance behind the vehicle to warn workers of the vehicle when moving backwards. A second transmitter is mounted above the load and directionally aimed downward to form an elliptical conical pattern for a limited distance in front of the vehicle, thus alerting workers within the path of the approaching load or vehicle. Workers on either side and a considerable distance away are not being constantly bombarded with noise and light which could potentially be ignored.

A further use of the technology is to provide a fixed transmitter in known hazardous areas. i.e. areas, with dangerous levels of hydrogen sulfide, benzene, radon, radioactive materials, high voltages, or dangerous or sensitive equipment. Therefore, a worker entering such areas receives a personal audible and visual alert warning, while those outside the danger area are not exposed to a constant warning.

BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein:

FIG. 5 is a side elevation view of the load warning system used in an alternative application;

FIG. 6 is a top view of the signal path generated by the transmitter illustrated in FIG. 5;

FIG. 7 is an isometric view illustrating an alternative, portable embodiment of the load warning system transmitter portion;

FIG. 8 is a side elevation view of the transmitter illustrated in FIG. 7 in operation;

FIG. 9 is a partial top view of the crane end 14 shown in FIG. 1 with ultrasonic transducer positioning locations;

DETAILED DESCRIPTION OF THE PREFERRED EMBODIMENT

Figure 1:
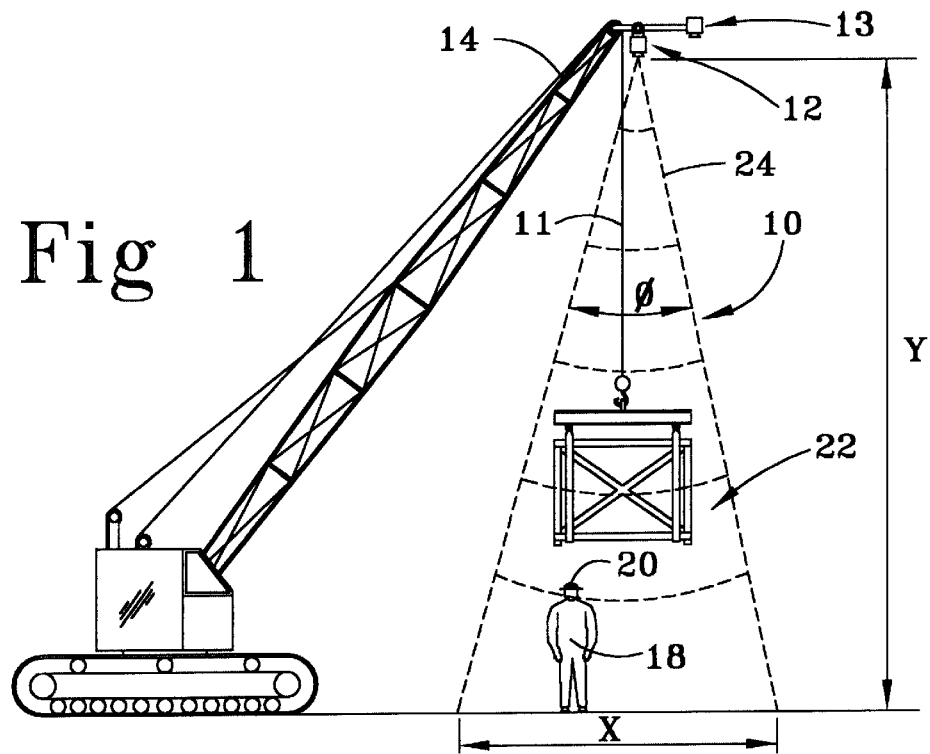
FIG. 1 is a side elevation view of the load warning transmitter system in operation.
Figure 2:
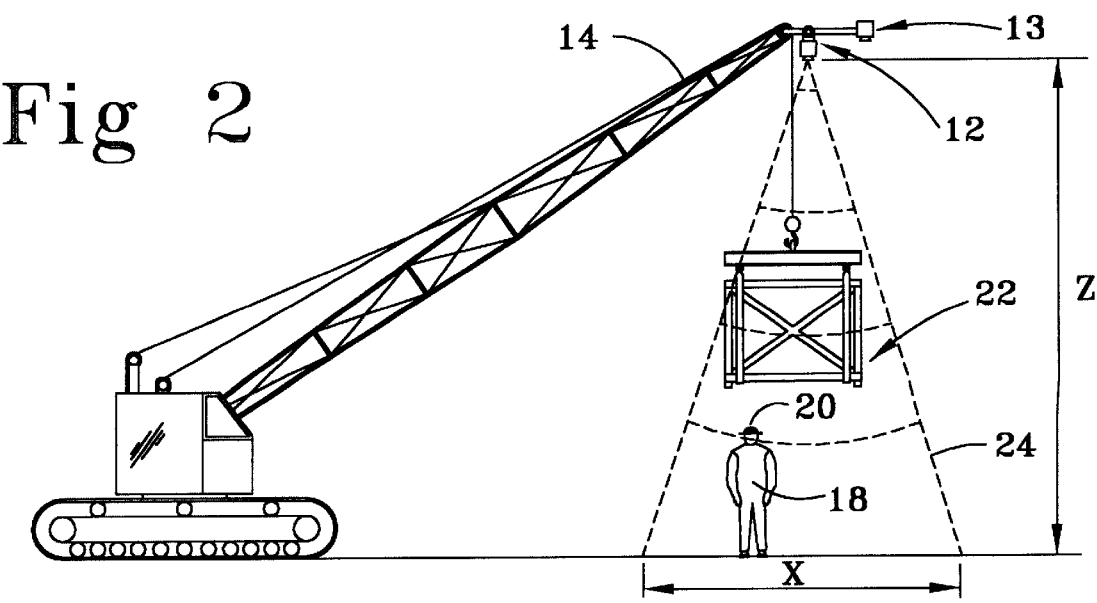
FIG. 2 is a $2^{nd}$ side elevation view of the load warning transmitter system in operation.

The load warning system 10 disclosed herein, first illustrated in FIG. 1, includes two main elements: A directional signal transmitter 12, seen pivotally located at the tip end of a crane boom 14, which also includes a range finder sensor 13 and a portable receiver 16 located on a worker 18, typically on the worker's safety hat 20 better seen in FIGS. 3 and 4. The signal transmitter is positioned in a manner whereby the transmitter 12 remains consistently parallel with the cable 11 supporting a load 22 as seen in FIG. 1. In this case the optical transmitter 12, preferably utilize infra-red frequency technology. However, other technologies, such as RF and ultrasonic systems, may be developed to perform all or parts of the warning task. As seen in FIG. 1, the optical transmitter 12 includes an ultrasonic range finder transmitter/transducer 13,15 shown in block diagram in FIG. 10 used to determine the distance from crane tip to ground or deck level, represented as distance "Y". This information is fed into a microprocessing unit 19, which then controls the focal length of an infra-red optical beam via driver "A", and a stepper motor 21, which drives a positioning screw 23 for positioning a projection lens 29A relative to a infra-red emmitting diode(s)25 controlled by the microcontroller 19 and its associated condenser lens 29 and projection lens 29A via driver "B", thus producing a cone shaped infra-red zone or field around a suspended load represented as distance "X". The clock 37 sets the frequency or pulse rate in the microprocessor 19 for the infra-red emitting diode(s), thereby establishing an individual signature for the system detectable only by infra-red receivers tuned with matching frequency. The stepper motor 21 further includes a proximity sensor 42 which provides positioning information to the microcontroller. The ratio of distance "X" to distance "Y" is maintained in such a manner as to insure that the transmitter's warning zone or field 24 is always larger than the average load. However, the ratio may be changed at will to accommodate abnormal loads. The transmitter's warning zone or field 24 always exceeds the size of the load and the zone or field remains constant relative to the height "Z" of the boom as seen in FIG. 2.

Figure 3:
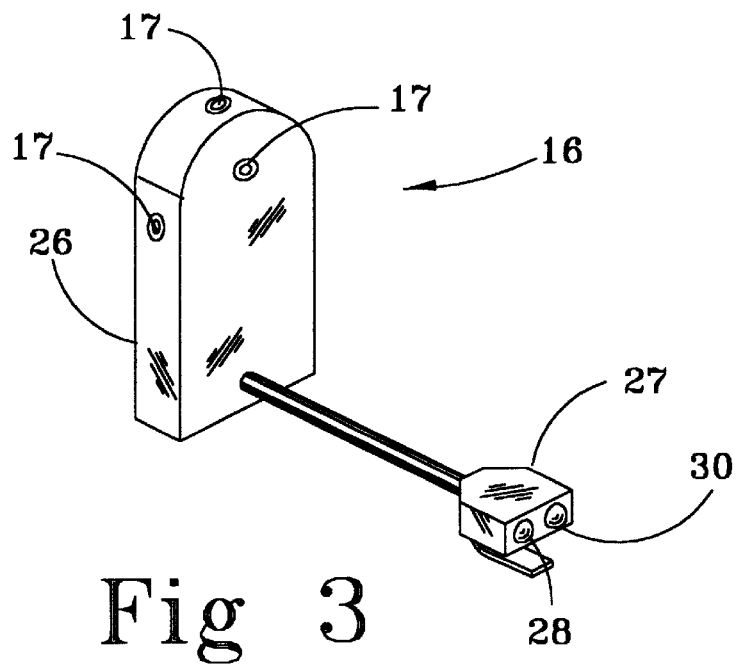
FIG. 3 is an isometric view of the individual receiver portion of the system.
Figure 4:
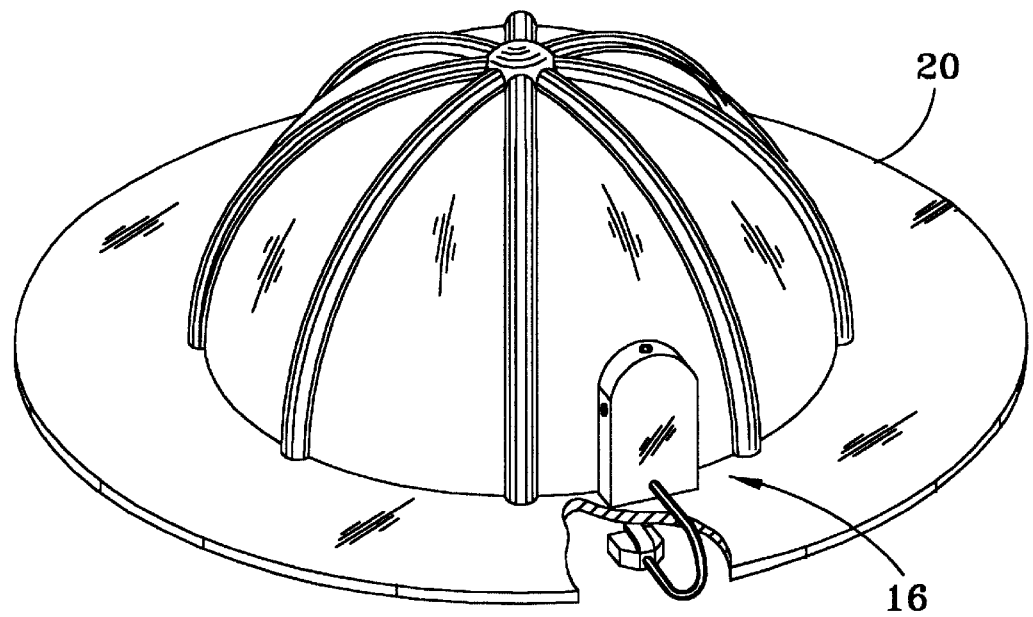
FIG. 4 is an isometric view of an anticipated location of the receiver portion of the system.
Figure 10:
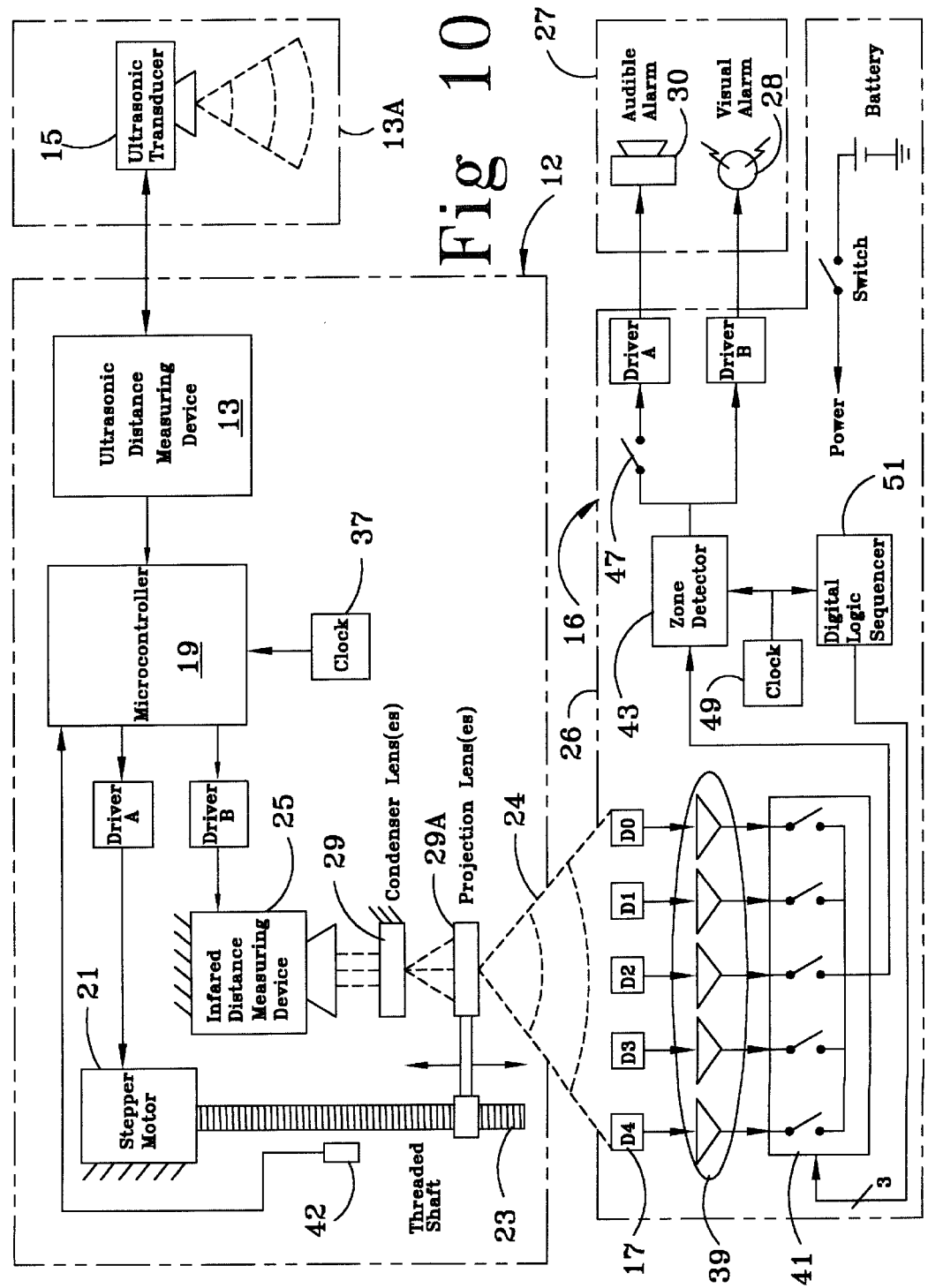
FIG. 10 is a block schematic diagram of the transmitter and receiver 12 and 16.

The receiver portion 16, seen in FIG. 3, of the load warning system 10 is a small case 26 for housing the receiver circuit board and an array of sensors 17 arranged to maintain visual contact with the infra-red signal transmitter 12 regardless of the angularity of the worker's hat 20 when inside the load zone or field 24, a small battery power supply, and a means for attachment to a worker's hard hat as seen in FIG. 4. As seen in FIG. 10 the receiver 16 further includes a plurality of buffers 39 connected to a multiplexer 41 which in turn is connected to a tone detector 43. An internal clock 49 adjust the frequency of the tone detector 43 to set the frequency of the audible alarm 30 and adjusts the frequency of the incoming signal to match the transmitter frequency via a digital logic sequencer 51 which also out-puts into the multiplexer 41. The tone detector 49 out-puts through a pulsation switch 47 to a driver "A" for driving a buzzer, chirper or other such audible alarm 30. The tone detector 43 further out-puts to a Driver "B" for actuating an LED or other such visual alarm 28. The receiver case 26 and its audible and visual indicators 28,30 in case 27 should be mounted on the safety hard hat 20, as seen in FIG. 4, and in a manner whereby the light mounting is only seen with peripheral vision so as not to otherwise obstruct the worker's vision. In any case, the worker is personally warned of the potential danger in some manner only when he is within the traveling load warning zone or field or entering such a warning zone.

Obviously, the load warning system may be adapted to all types of cranes, including bridge cranes.

It is also anticipated that the technology may be utilized to produce a load or hazardous warning zone or field 24 in linear directional signal for use on moving vehicles 32, as seen in FIG. 5. Therefore, only workers 18 within the immediate path of the vehicle will be warned Signal strength may also be controlled to expand or reduce the area covered by the warning zone or field 24. It is preferable that the infra-red transmitter be located at the highest point possible on the vehicle and configured to produce an elliptical shaped zone or field 33 both fore and aft of the moving vehicle 32, as shown in FIG. 5 and 6. The angle should also be adjusted to insure a safe zone or field 24 with sufficient distance from the vehicle to insure the worker has sufficient time to evade in accordance with the vehicle's speed.

Figure 11:
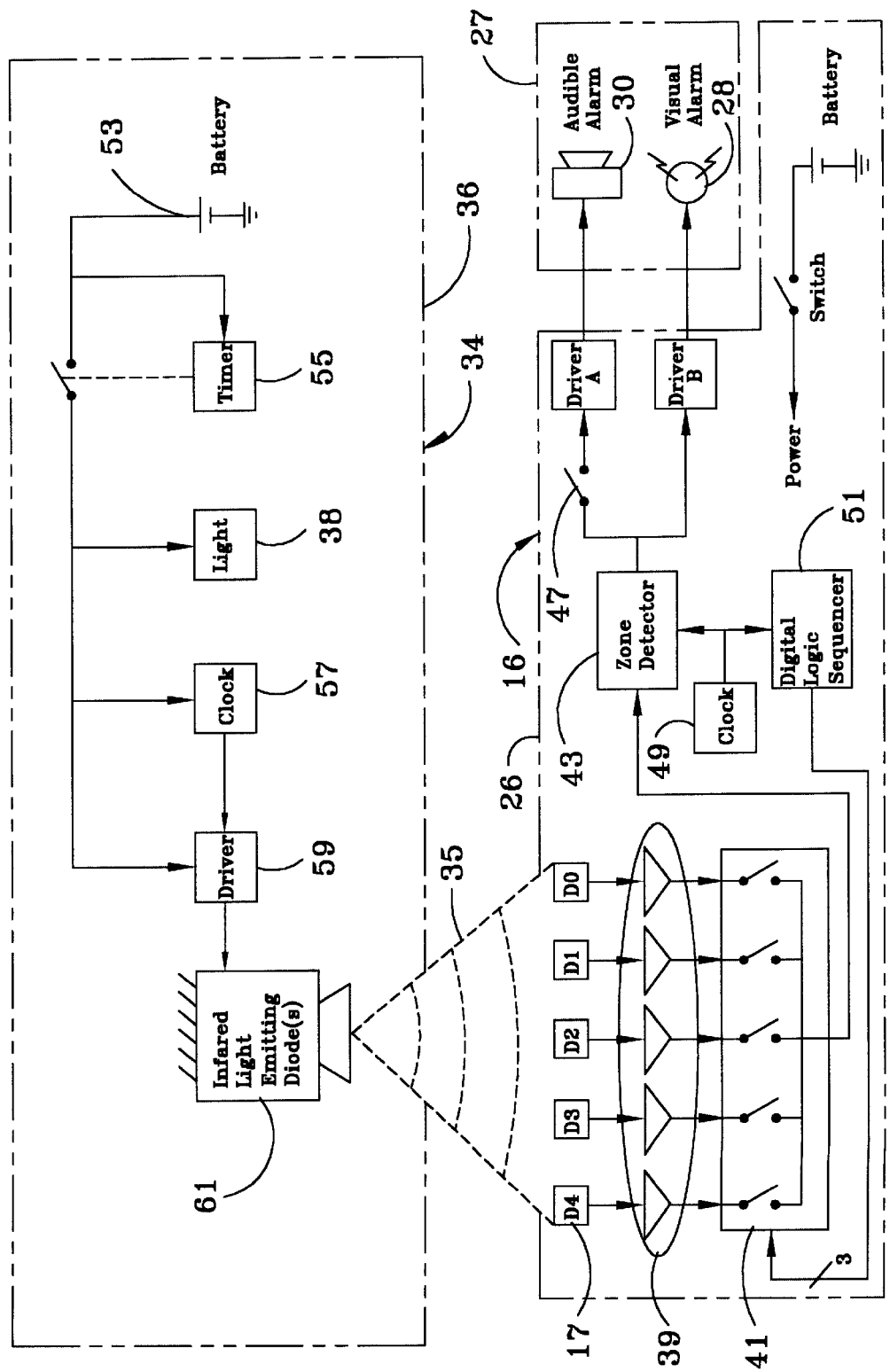
FIG. 11 is a block schematic diagram of the transmitter 34 and receiver 16.

It is further anticipated that a zone or field directly below the load 22 may exist which does not allow the worker to receive the load warning signal due to deflection of the warning signal off the load 22 as seen in FIG. 1. Therefore, to insure complete zone or field coverage, a portable signal transmitter assembly 34, which includes a signal transmitter 36, further including a rechargable battery power supply 53, a timer and switching element 55, a clock 57 for setting the frequency which outputs to a driver 59 for an infra-red emitting diode(s)61, a strobe light 38, and an attachment hook or loop 40 as seen in FIG. 7, diagrammed in FIG. 11. Such devices can then be attached to the load 22 at or near the lower portion of the load as shown in FIG. 8, to insure zone or field coverage 35. The portable signal devices 34 seen in FIG. 7 may be used separately or in conjunction with the crane boom transmitter 12.

It is also anticipated that such a warning system could be utilized in a stationary manner whereby a transmitter 12 is placed on pedestal in a hazardous area and allowed to transmit a limited signal in any plane or direction, including a 360 degree rotating field. Therefore, any worker entering the field while wearing a receiver tuned to the transmitted frequency is warned, while those who are not within the warning zone or field are not bombarded with audible and visual warnings. One such application of this type of warning could be a road hazard with the transmitter directed toward oncoming traffic.

It is further anticipated that a special warning frequency could be established which will be an international standard for emanate hazard warning. Such warning could be used to override am/fm broadcast on automobile radios to warn drivers of impending hazards or simply be a separate receiver mounted on the vehicle to receive such signals and alert the driver.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. A personalized hazard warning system comprising:
    a) a mobile transmitter producing a focused, optical energy beam producing a diverging field directed in the direction of a traveling load; and
    b) a mobile personal optical receiver having both audible and visual alarm automatically activated when entering said field.

2. The warning system according to claim 1 wherein said transmitter is an infra-red device having selectable wave frequency and adjustable field configuration.

3. The warning system according to claim 2 wherein said field configuration is adjusted automatically to maintain a fixed ratio between said transmitter location and a selected field size.

4. The warning system according to claim 1 wherein said receiver further comprises a battery power source, a means for attachment to personnel safety equipment, and an array of directional field sensors set to detect said field emitted by said transmitter.

5. The warning system according to claim 1 wherein said transmitter is portable and further comprises:
    a) a battery power supply;
    b) a portable optical signal emitting means
    c) a means for establishing and focusing a diverging field and setting a frequency for said emitting means;
    d) a strobe light having flashing means powered by said battery; and
    e) an external means for removably coupling said transmitter to an object.

6. An individual personnel warning system for detecting moving loads comprising:
    a) A mobile transmitter producing a focused optical energy beam having a diverging field suspended above a traveling load said transmitter emanating a specified, directional variable field that encompases and precedes said load; and
    b) a mobile personal optical receiver having a sensor array tuned to detect said energy beam when located within said field said receiver having visual and audible alarm means.

7. The individual personnel warning system for detecting moving loads according to claim 6 wherein said transmitter is an infra-red device having selectable wave frequency and adjustable field configuration.

8. The individual personnel warning system for detecting moving loads according to claim 6 wherein said field is adjusted automatically to maintain a fixed ratio between said transmitter location and a selected field size.

9. The individual personnel warning system for detecting moving loads according to claim 6 wherein said receiver further comprises a battery power source, a means for attachment to personnel safety equipment, and an array of directional field sensors set to detect said field emitted by said transmitter.

10. A personal warning system for selectively warning workers who may be in emanate danger as a result of a moving load comprising:
    a) a mobile optical transmitter suspended above a traveling load, said transmitter producing a shaped field at a selected optical frequency that precedes said load;
    b) a mobile receiver having an array of optical sensors located upon a worker's person tuned to receive and react to said selected optical frequency upon entering said shaped field; and
    c) a means for producing an audible and visual alarm signal connected to said receiver activated by said receiver upon entering said field.

11. The personal warning system for selectively warning workers who may be in emanate danger as a result of a moving load according to claim 10 wherein said transmitter is suspended above a load suspended from a crane and wherein said field encompasses said load.

12. The personal warning system for selectively warning workers who may be in emanate danger as result of a moving load according to claim 11 wherein said transmitter further comprises a means for compensating for transmitter location relative to said field dimension.

13. The personal warning system for selectively warning workers who may be in emanate danger as a result of a moving load according to claim 11 wherein said system further comprises portable transmitters suspended from said traveling load, said transmitters producing a shaped field at a selected optical frequency that matches said receiver frequency.

14. The personal warning system for selectively warning workers who may be in emanate danger as result of a moving load according to claim 13 wherein said portable transmitter further comprises a visual pulsating light.

15. A method for selectively warning personnel of an emanate danger zone comprising the steps of:
    a) providing a mobile transmitter capable of producing an optical energy field; and
    b) projecting said optical energy field at a selected frequency adjacent an object; and
    d) providing a mobile personal receiver worn by a worker the receiver having both audible and visual alarm automatically activated when entering said field.

16. The method for selectively warning personnel of an emanate danger zone according to claim 15 further comprising the step of placing a plurality of optical energy transmitters on and around an object said transmitters producing a limited field having a selected frequency that is detectable by any optical receiver tuned to said frequency.

* * * * *